Feb. 18, 1941.   E. O. SCHWEITZER, JR   2,232,143
ELECTRIC FIELD MOTOR
Filed March 23, 1938    3 Sheets-Sheet 1
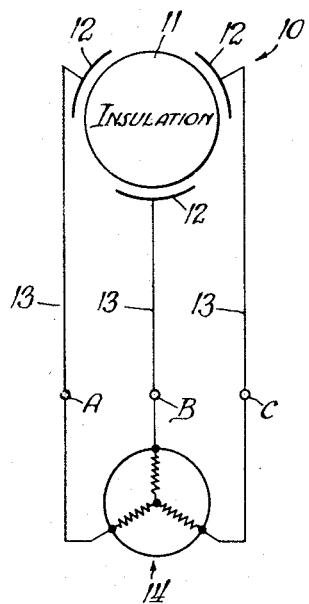
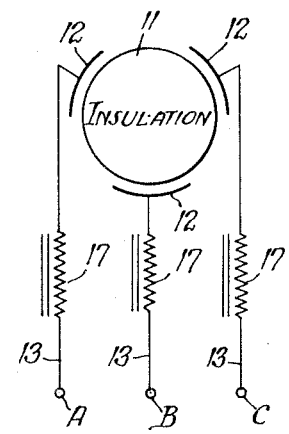
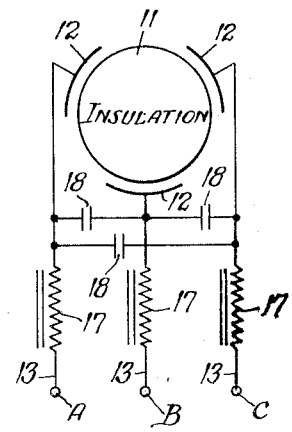
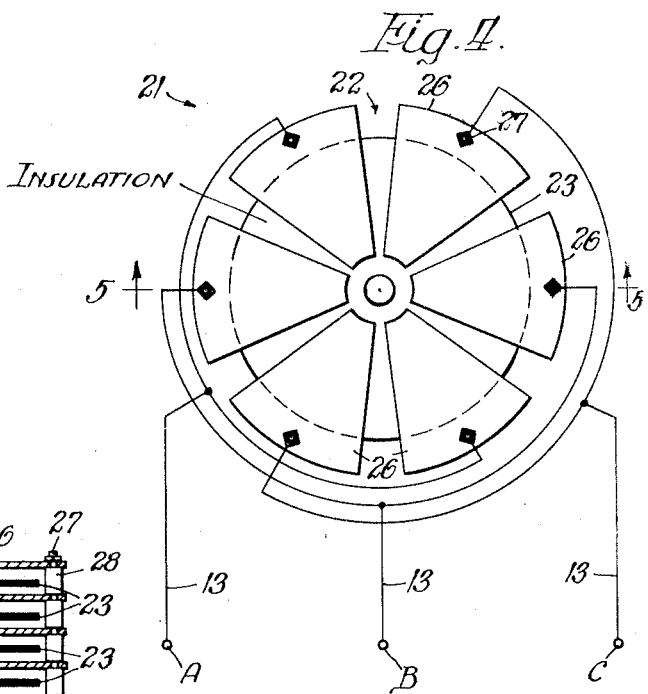
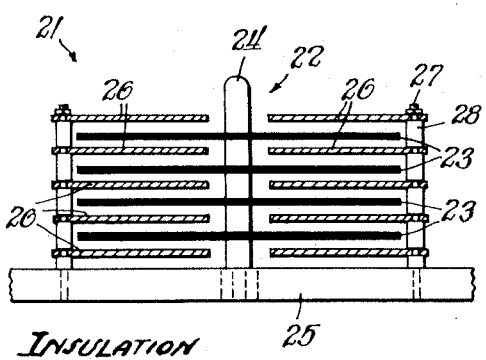
Inventor:
Edmund O. Schweitzer, Jr.
By
Brown, Jackson, Boettcher & Dienner
Attys.

Inventor:
Edmund O. Schweitzer, Jr.

Feb. 18, 1941.  E. O. SCHWEITZER, JR  2,232,143
ELECTRIC FIELD MOTOR
Filed March 23, 1938   3 Sheets-Sheet 3

Inventor:
Edmund O. Schweitzer, Jr.
By Barnum, Jackson, Boettcher & Dienner
Attys.

Patented Feb. 18, 1941

2,232,143

UNITED STATES PATENT OFFICE 2,232,143

ELECTRIC FIELD MOTOR

Edmund O. Schweitzer, Jr., Northbrook, Ill.

Application March 23, 1938, Serial No. 197,605

5 Claims. (Cl. 172—120)

My invention relates, generally, to electric motors and it has particular relation to electric field motors. This application is a continuation-in-part of my copending application Serial No. 136,986, filed April 15, 1937, now Patent Number 2,216,254, dated Oct. 1, 1940.

An object of my invention is to rotate a member formed of insulating material by means of an electric field.

Another object of my invention is to generate a shifting electric field for initiating the rotation of a member formed of insulating material.

Still another object of my invention is to provide a self-starting synchronous electric field motor.

A further object of my invention is to provide a non-self-starting synchronous electric field motor.

Aother object of my invention is to employ the capacitive reactance of an electric field motor in producing a relatively high voltage for operating the same from a relatively low voltage alternating current source.

When a member formed principally of insulating material is placed under the influence of a rotating electric field, it tends to rotate in the direction of rotation of the electric field to reduce to a minimum the change in direction of the dielectric strain. There is a tendency for the tubes of force to follow the rotating electric field that generates them and thus the insulating member tends to follow, since the strain follows the stress. Advantage is taken of this principle in the construction of an electric field motor.

In one embodiment of my invention one or more discs or a cylinder of insulating material are rotatably mounted and arranged to cooperate with a plurality of metallic field plates spaced uniformly therearound. The field plates are energized from an alternating current source in such manner that an electric field is generated which shifts from one field plate to the next field plate and, thereby, causes rotation of the rotatable insulating element in this shifting field.

When it is desired to cause the rotor to rotate at a synchronous speed, it may be so constructed as to provide a number of polar projections of insulating material. The speed at which it rotates will bear a fixed relationship to the frequency of the alternating current source which is employed to energize the field plates.

The shifting electric field can be generated either by employing a polyphase alternating current source, such as a polyphase generator or a phase shifting circuit, as will be readily understood. The shifting electric field may also be generated by providing extensions of insulating material from each of the field plates which extend in one direction toward the adjacent field plate. In this case the field plates may be energized from a single phase source of alternating current.

It is desirable to apply relatively high voltage to the electric field plates in order to operate the motor. Since the motor of the electric field type is essentially a capacitor, advantage may be taken of this fact to provide an inductor in series circuit relation with it, the inductive reactance of which is such that when it is combined with the capacitive reactance of the motor, a series resonant circuit results. A relatively low voltage alternating current source can then be employed without the use of other auxiliary equipment to apply the desired high voltage to the motor for energizing it.

My invention is disclosed in detail in the embodiments thereof shown in the accompanying drawings, and it comprises the features of construction, combination of elements, and arrangement of parts which will be exemplified in the constructions hereinafter set forth and the scope of the application of which will be indicated in the appended claims.

For a more complete understanding of the nature and scope of my invention, reference may be had to the following detailed description, taken in connection with the accompanying drawings, in which:

Figure 1 illustrates, diagrammatically, an electric field motor constructed in accordance with one embodiment of my invention;

Figure 2 is a view, similar to Figure 1, and in addition showing inductors in the circuit connections;

Figure 3 is a view, similar to that shown in Figure 2, and in addition showing how capacitors may be connected across the electric field pieces;

Figure 4 is a view, in top plan, of another embodiment of the electric field motor;

Figure 5 is a sectional view taken generally along the line 5—5 of Figure 4, the base and rotor being shown in elevation;

Figure 6:
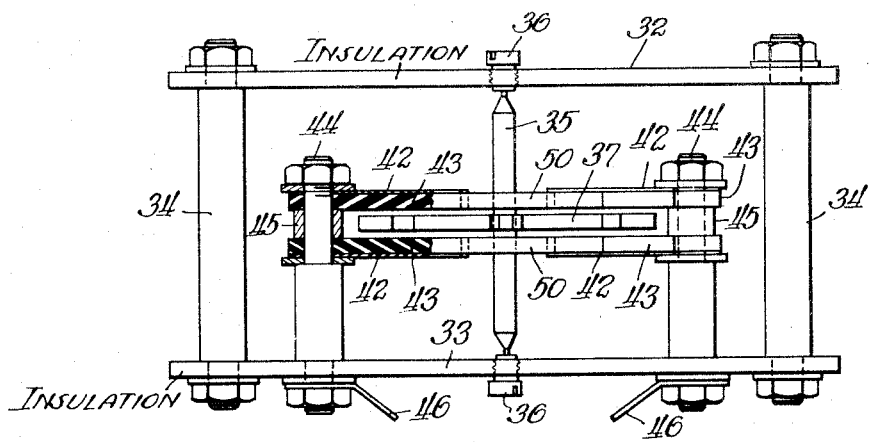
Figure 6 is a view, in side elevation, of a self-starting synchronous electric field motor, a portion of one pair of field members being broken away in order to more clearly illustrate the details of construction.

Referring now particularly to Figure 1 of the drawings, it will be observed that the reference character 10 designates, generally, an electric field motor having a rotor 11 and electric field pieces 12. The rotor 11 is formed preferably of an insulating material having a relatively high dielectric constant such as glass, "Bakelite," cork, and the like. The electric field pieces 12 may be formed of any suitable conducting material such as brass, copper, or aluminum, and the inner faces adjacent the rotor 11 form arcuate sections of a cylinder the center of which is preferably coaxial with the axis of the rotor 11.

The motor 10 is arranged to be connected by conductors 13 to terminals A, B, and C, which, in turn, may be connected to the polyphase source of alternating current, shown generally at 14. While a three-phase generator 14 has been illustrated for generating the polyphase alternating current, it will be understood that any other suitable polyphase generating means may be employed, such as a two-phase generator, a generator in which more than three phases are provided, or a phase shifting circuit that may be energized from a single phase source. It is essential that the terminals A, B, and C have applied thereto a polyphase voltage so that the electric field pieces 12 may be successively energized to generate a shifting electric field therebetween.

As indicated hereinbefore, an insulator that is subjected to the influence of a rotating electric field tends to rotate in the field in such manner as to reduce to a minimum the change in direction of the dielectric strain therein; the rotor 11 will thus rotate about its axis when the electric field pieces are energized as described.

It will be observed that the motor 10 is essentially a capacitor. Advantage may be taken of this fact to require the application of a relatively small voltage to the terminals A, B, and C by the generator 14 for applying a relatively high voltage to the electric field pieces 12. Such an arrangement is illustrated in Figure 2 of the drawings.

As illustrated, inductors 17 are interconnected in the conductors 13 which serve to connect the electric field pieces 12 to the terminals A, B and C. No particular source of polyphase alternating current is shown connected to these terminals since, as indicated above, any suitable source of polyphase alternating current may be employed. The inductance of the inductors 17 is so chosen that it is substantially equal to the capacitance of the electric field pieces 12 and the rotor 11 so that a series resonant condition is obtained. In this manner a relatively high voltage may be applied to the electric field pieces 12 although a relatively low polyphase alternating current voltage is applied to the terminals A, B and C. While it will be understood that the inductive reactance of the inductors 17 may not be exactly equal to the capacitive reactance of the electric field pieces 12 and the rotor 11, it is preferable that this relationship obtain so that the series resonant condition will exist and a minimum of voltage will be required to be applied to the terminals A, B, and C.

In Figure 3 of the drawings I have illustrated a reactance network between the motor 10 and the terminals A, B and C in the form of the inductors 17 and capacitors 18. The capacitors 18 are connected in Delta circuit relation across the inductors 17 or the conductors 13 and across adjacent electric field pieces 12. The values of inductance and capacitance for the inductors 17 and capacitors 18 may be so chosen that the reactance network will function under series resonant conditions. The motor 10, which is connected across the capacitors 18, will then have applied thereto a relatively high polyphase alternating current voltage although a relatively low voltage is applied to the terminals A, B, and C.

While the series resonant circuits, or circuits approaching this condition, are illustrated in Figures 2 and 3 of the drawings, as being applicable for practicing my invention, it will be understood that the motor 10 may be energized directly from a suitable polyphase alternating current source, such as the source 14 shown in Figure 1. However, when it is desired to apply a relatively high voltage for operating the motor 10 from a relatively low voltage source, the circuits shown in Figures 2 and 3 may be employed, as indicated.

In Figures 4 and 5 of the drawings, the reference character 21 designates, generally, another embodiment of the electric field motor. As shown, the motor 21 comprises a rotor 22 that is made up of a plurality of discs 23 which may be mounted in spaced apart relation on an axle 24. The plates 23 are formed of a suitable insulating material such as glass, porcelain, "Bakelite," or the like. The axle 24 is also formed of a suitable insulating material and it is rotatably mounted on a base plate 25 that also is formed of a suitable insulating material. On opposite sides of and around the discs 23 a plurality of sector-like electric field plates 26 are positioned as illustrated. The field plates 26 are formed of suitable conducting material such as brass, copper, or aluminum and they are mounted on studs 27 that are carried by the base plate 25 and they are spaced apart by suitable metal spacers 28. Nuts threaded on the upper ends serve to hold the electric field plates 26 in position.

As shown in Figure 4, opposite pairs of electric field plates 26 are electrically connected together and these pairs are connected by the conductors 13 to the terminals A, B and C. It will be understood that these terminals may have applied thereto a polyphase alternating current voltage as indicated hereinbefore. It will also be understood that the series resonant circuits shown in Figures 2 and 3 of the drawings may be interconnected in the conductors 13. While three pairs of electric field plates 26 have been illustrated in Figures 4 and 5 of the drawings it will be understood that a greater or a lesser number may be employed.

Since the adjacent edges of the electric field plates 26 are at different potentials the tubes of force forming the electrostatic field not only thread directly between them but also they thread through the adjacent discs 23. This electric field is constantly shifting, since the terminals A, B and C are connected to a suitable source of polyphase alternating current. As a result, the discs 23 rotate in order to assume a position of minimum change in dielectric strain.

Figure 7:
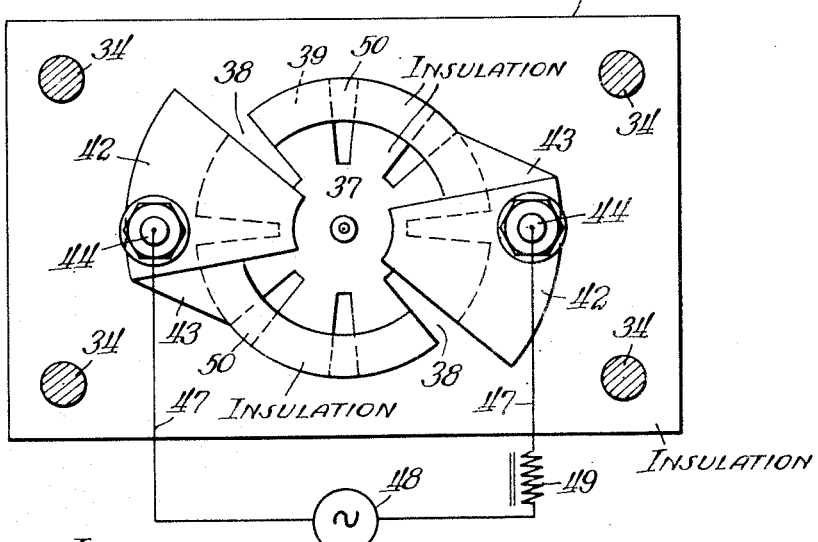
Figure 7 is a top plan view of the motor shown in Figure 6.

In Figures 6 and 7 of the drawings, I have illustrated a self-starting single phase synchronous electric field motor. This motor is shown generally at 31. It comprises a suitable frame formed by upper and lower plates 32 and 33 of suitable insulating material that are held in spaced apart relation by suitable threaded studs 34. A shaft 35, mounted in adjustable bearing members 36 located, as illustrated, in the upper and lower plates 32 and 33 serves to mount a disc shaped rotor 37 formed of insulating material. As shown more clearly in Figure 7, the disc-shaped rotor 37 is provided with a plurality of radial slots 38 thereby forming a plurality of sector shaped pole portions 39. In this case eight pole portions 39 are provided. However, it will be understood that a greater or a lesser number may be used as desired.

With a view to providing the electric field for rotating the disc-shaped rotor 37, electric field plates 42 are provided on pole members 43. The electric field plates 42 are formed of metal, such as aluminum foil, and may be pasted or otherwise secured to the upper and lower surfaces of the pole members 43. The pole members 43 are formed of insulating material for a purpose that will be presently set forth. The electric field plates 42 and the pole members 43 are mounted on threaded studs 44, as shown, and are spaced apart by spacers 45. Terminal connectors 46, secured to the portions of the studs 44 extending through the lower plate 33, provide for connecting conductors 47 thereto which in turn are connected to a source of alternating current 48. An inductor 49 is provided, as illustrated, so that the series resonant circuit condition may be obtained for the purpose set forth hereinbefore.

The shifting electric field is generated by reason of the fact that the insulating pole members 43 are provided with polar extensions 50. It will be observed that the polar extensions 50 extend from the pole members 43 in one direction only and toward the next pole member. It will also be observed that the polar extensions 50 are positioned on opposite sides of the disc-shaped rotor 37 and that they are substantially coextensive with the same.

Preferably, the disc-shaped rotor 37 and the polar extensions 50 are formed of insulating material having a substantial dielectric hysteresis loss so that there will be a sufficient power component available for applying torque to the rotor 37 for causing it to revolve. When the electric field plates 42 are energized, as from the single phase alternating current source 48, the electric field spreads from the pole members 43 to the extreme ends of the polar extensions 50 integrally formed therewith. An amount of work is done on the polar extensions 50 in this movement of the electric field which depends upon the magnitude of the dielectric hysteresis loss. Thus, as the electric field spreads, the dielectric loss adds a power component to the electric field so that the electric field remote from the field plates 42 lags behind the electric field adjacent thereto. During each half cycle of the alternating current or during each pulsation of the electric field, the axis of the field may be considered to shift from the electric field plates 42 out along the polar extensions 50 so that a rotating electric field is set up which corresponds to that which results when a polyphase alternating current source is employed, i. e., as shown in Figure 1. It will be observed, however, that, when the polar extensions 50 of insulating material are employed only a single phase source 48 is required to provide the rotating electric field rather than a polyphase source.

The disc-shaped rotor 37 is likewise formed of insulating material having substantial dielectric hysteresis loss. It tends to turn because the strain produced therein by the stress of the shifting electric field traversing the polar extensions 50 tends to follow the change in direction of the stress so that a minimum of energy will be expended in hysteresis loss. The speed at which the rotor 37 will rotate depends upon the number of sector-shaped pole portions 39 that are present. In Figure 7 of the drawings, eight pole portions 39 are shown. Consequently, the rotor 37 will revolve at a speed of 900 revolutions per minute if the source 48 has a frequency of 60 cycles per second.

Figure 8:
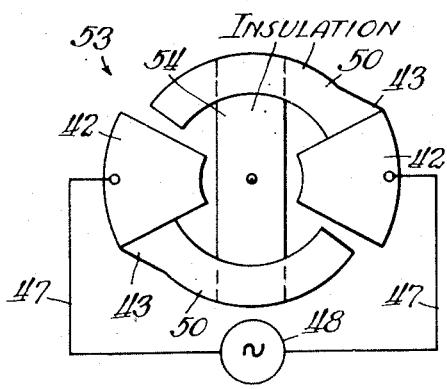
Figure 8 illustrates, diagrammatically, a self-starting synchronous electric field motor having a shuttle type rotor.

In Figure 8 of the drawings a motor, designated generally by the reference character 53, is diagrammatically shown. The motor 53 is similar to the motor 31, shown in Figures 6 and 7. However, it is provided with a shuttle type of rotor 54 having only two polar projections rather than eight pole portions as is the case for the rotor 37. With a 60-cycle source the rotor 54 will be caused to rotate at a speed of 3,600 revolutions per minute.

Figure 9:
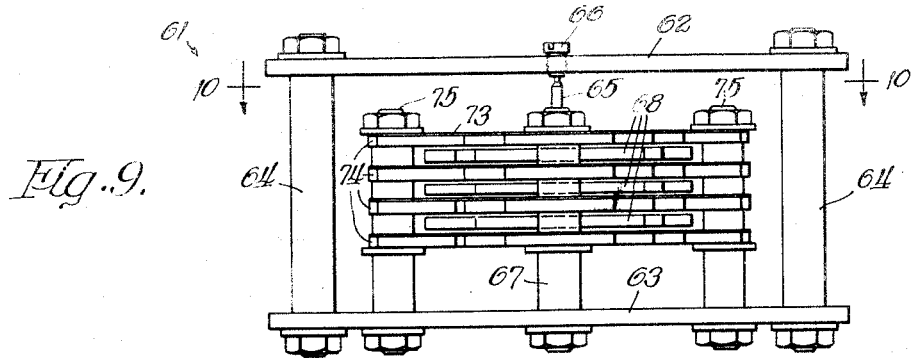
Figure 9 is a view, in front elevation, of a self-starting synchronous electric field motor having four sets of field plates and a plurality of rotor discs and arranged for single-phase operation.
Figure 10:
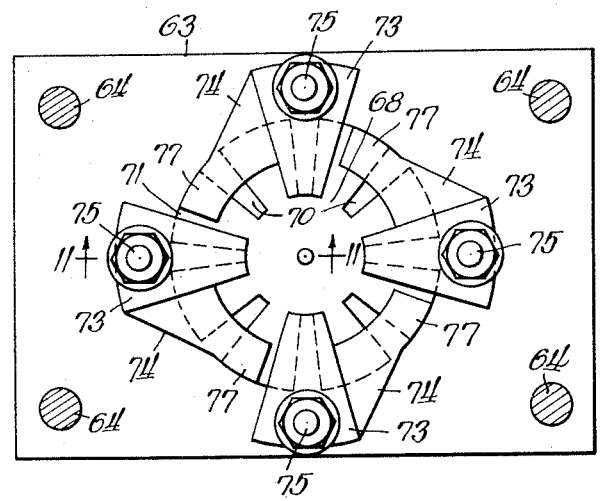
Figure 10 is a sectional view taken along the line 10—10 of Figure 9.

In Figures 9 and 10 another embodiment of the self-starting single-phase synchronous electric field motor is shown. The motor 61 is provided with a frame formed by upper and lower plates 62 and 63 of suitable insulating material. The plates 62 and 63 are spaced apart by studs 64.

Between the plates 62 and 63 a shaft 65 is rotatably mounted in a threaded bearing member 66 in the upper plate 62 and on a bearing stud 67 carried by the lower plate 63. As shown more clearly in Figure 11 a plurality of rotor discs 68 are mounted on the shaft 65 and spaced apart by spacers 69. The rotor discs 68 are provided with radial slots 70, thereby forming sector-shaped pole portions 71, Figure 10.

The stator for the rotor discs 68 is formed in part by electric field plates 73 mounted on the pole members 74. As described hereinbefore, the field plates 73 may be formed of aluminum foil and pasted onto the pole members 74, which are formed of insulating material. The field plates 73 and pole members 74 are suitably mounted on threaded studs 75 which are carried by the lower plate 63. They are spaced apart by spacers 76.

With a view to shifting the axis of the electric field from each of the electric field plates in the direction in which it is desired to rotate the rotor discs 68, the pole members 74 are provided with polar extensions 77, Figure 10, which act in the manner described hereinbefore when the field plates are energized from a single phase alternating current source.

Figure 11:
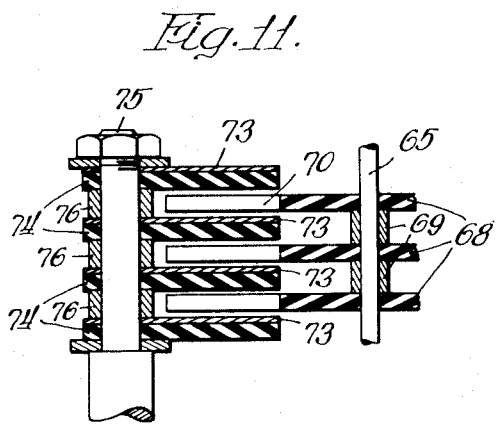
Figure 11 is a detail sectional view taken along the line 11—11 of Figure 10.

When the motor construction shown in Figures 9, 10, and 11 is employed, the rotor formed by the discs 68 will run at a speed of 900 revolutions per minute. It will be understood, of course, that while only three rotor discs 68 have been illustrated, a larger number may be employed. The larger the number of rotor discs 68 that is used the less will be the applied voltage necessary to satisfactorily operate the motor. It will be understood that opposite sets of electric field plates 73 will be connected together and to one terminal of the single phase alternating current source.

Figure 12:
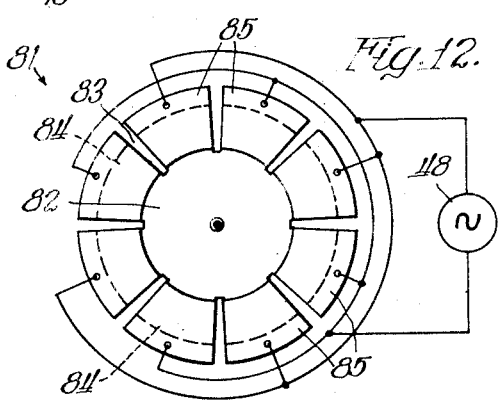
Figure 12 illustrates diagrammatically the arrangement that may be employed for providing a non-self-starting synchronous electric field motor.

In Figure 12 of the drawings I have illustrated a non-self-starting synchronous electric field motor. The reference character 81 designates, generally, this motor. It comprises one or more rotor discs 82 of insulating material having radial slots 83 therein forming sector-shaped pole portions 84 therebetween. Sector-shaped electric field plates 85, formed of metal, are provided for connection to the source of alternating current 86. In this embodiment of the invention the polar extensions are omitted so that the shifting electric field is not generated. It is necessary to bring the rotor 82 up to synchronous speed by some means such as manually spinning it in order to permit it to operate at synchronous speed.

In Figure 12 the motor 81 is provided with a rotor 82 having eight pole portions 84 and a stator having eight electric field plates 85. This motor will run at a speed of 900 revolutions per minute.

Since certain further changes may be made in the foregoing constructions and different embodiments of the invention may be made without departing from the scope thereof, it is intended that all matter shown in the accompanying drawings or described hereinbefore shall be interpreted as illustrative and not in a limiting sense.

I claim as my invention:

1. An electric field motor comprising, in combination, a rotor formed of insulating material radially slotted to provide a polar construction, a plurality of metallic electric field plates disposed in insulated spaced relation around said rotor, and circuit means for connecting said field plates to a source of alternating current whereby said rotor operates at a speed which is fixed with respect to the frequency of said source of alternating current.

2. A self-starting synchronous alternating current motor comprising, in combination, a rotor formed of insulating material radially slotted to provide a polar construction, a plurality of metallic electric field plates disposed in insulated spaced relation around said rotor for connection to a source of alternating current, and means for generating an electric field shifting from each field plate toward the next field plate whereby said rotor is rotated at a speed which is fixed with respect to the frequency of said source of alternating current.

3. A self-starting synchronous alternating current motor comprising, in combination, a rotor having insulating material forming a polar construction, a plurality of metallic electric field plates disposed in insulated spaced relation around said rotor for connection to a source of alternating current, and insulating means extending in one direction from at least one of said field plates toward the adjacent field plate to continuously shift the axis of the electric flux in each pulsation from its initial position with respect to at least said one field plate whereby said rotor is started from rest in the direction in which said insulating means extends.

4. A self-starting synchronous alternating current motor comprising, in combination, a disc-shaped rotor having insulating material having substantial dielectric hysteresis loss with a plurality of radial slots forming a polar construction, a plurality of pairs of metallic electric field plates disposed in insulated spaced relation around said disc-shaped rotor and on opposite sides thereof for connection to a source of alternating current, and insulating means having substantial dielectric hysteresis loss extending in one direction from at least one of said field plates toward the adjacent field plate to continuously shift the axis of the electric flux in each pulsation from its initial position with respect to at least said one field plate whereby said rotor is started from rest in the direction in which said insulating means extends.

5. In an electric motor, in combination, means for generating an alternating electric field, and a rotor rotatably mounted in said field and formed of insulating material radially slotted to provide a polar construction wherein polar dielectric strains are produced, the interaction between said electric field and said polar dielectric strains because of said polar construction causing rotation of said insulating means in synchronism with the frequency of said alternating electric field.

EDMUND O. SCHWEITZER, Jr.